United States Patent [19]

Herzl

[11] 4,339,957

[45] Jul. 20, 1982

[54] VORTEX-SHEDDING FLOWMETER WITH UNITARY SHEDDER/SENSOR

[75] Inventor: Peter J. Herzl, Morrisville, Pa.

[73] Assignee: Fischer & Porter Company, Warminster, Pa.

[21] Appl. No.: 192,351

[22] Filed: Sep. 30, 1980

Related U.S. Application Data

[63] Continuation-in-part of Ser. No. 178,176, Aug. 14, 1980, which is a continuation-in-part of Ser. No. 37,532, May 10, 1979, Pat. No. 4,262,544, which is a continuation-in-part of Ser. No. 13,557, Feb. 21, 1979, Pat. No. 4,226,117, which is a continuation-in-part of Ser. No. 944,624, Sep. 21, 1978, Pat. No. 4,181,020.

[51] Int. Cl.$^3$ .............................................. G01F 1/32
[52] U.S. Cl. .................................................. 73/861.24
[58] Field of Search ............ 73/861.21, 861.22, 861.24

[56] References Cited

U.S. PATENT DOCUMENTS

| | | | |
|---|---|---|---|
| 1,215,135 | 2/1917 | Fisher | 73/861.24 |
| 3,116,639 | 1/1964 | Bird | 73/861.24 |
| 3,796,096 | 3/1974 | Sielaff | 73/861.24 |
| 3,927,566 | 12/1975 | Zanker | 73/861.24 |

FOREIGN PATENT DOCUMENTS 2842556 4/1980 Fed. Rep. of Germany ... 73/861.24
823684 11/1959 United Kingdom ............. 73/861.24

*Primary Examiner*—Herbert Goldstein
*Attorney, Agent, or Firm*—Michael Ebert

[57] ABSTRACT

A vortex-shedding flowmeter capable of accurately measuring the flow rate of a liquid or gas even under extreme operating conditions. The fluid to be metered is conducted through a flow pipe having a shedder/sensor unit torsionally supported therein on a pivot axis normal to the flow axis of the pipe, said unit being caused to oscillate about said axis at a rate proportional to the flow rate of the fluid. The torsional support included a torque tube whose base is received within a bore in the pipe and is welded thereto and whose tip is welded to one end of the shedder/sensor unit to provide a closed structure preventing leakage of fluid from the pipe. These oscillations are converted into corresponding electrical signals by an external torque transducer operatively coupled to the unit by a sensor link assembly including a rod which extends into the torque tube and is welded to the tip thereof.

11 Claims, 6 Drawing Figures

VORTEX-SHEDDING FLOWMETER WITH UNITARY SHEDDER/SENSOR

RELATED APPLICATIONS

This application is a continuation-in-part of my companion copending application Ser. No. 178,176, filed Aug. 14, 1980, entitled "Vortex-Shedding Flow-meter with Torsional Sensor Mounted on Torque Tube," which companion application is a continuation-in-part of my copending application (A) Ser. No. 037,532, filed May 10, 1979, (now U.S. Pat. No. 4,262,544) entitled "Torque-Transducer for Vortex-Shedding Flowmeter Having Torsional Sensor," which is a continuation-in-part of my copending application (B), Ser. No. 013,557, filed Feb. 21, 1979, (now U.S. Pat. No. 4,226,117) entitled "Vortex-Shedding Flowmeter Having Drag Actuated Torsional Sensor," which in turn is a continuation-in-part of my then copending application (C), Ser. No. 944,624, filed Sept. 21, 1978, entitled "Vortex-Shedding Flowmeter Having A Sensing Vane" (now U.S. Pat. No. 4,181,020).

BACKGROUND OF INVENTION

This invention relates generally to vortex-shedding flowmeters, and more particularly to a flowmeter of this type which includes a shedder/sensor unit torsionally-mounted within the flow pipe by a torque tube which is coupled by a sensor link assembly to an external torque transducer to generate an output signal whose frequency is proportional to the flow rate of the fluid being metered, the flowmeter being capable of accurately measuring the flow rates of liquids or gases even under extreme operating conditions.

It is well known that under certain circumstances the presence of an obstacle or shedder in a flow pipe will give rise to periodic vortices. For small Reynolds numbers, the downstream wake is laminar in nature, but at increasing Reynolds numbers, regular vortex patterns are formed which are known as Karman vortex streets. The frequency at which these vortices are shed is a function of flow rate.

This phenomenon is exploited to create a flowwmeter for measuring the volumetric flow of fluids being treated or supplied in order to carry out various control functions. Flowmeters operating on this principle are disclosed in the Bird U.S. Pat. No. 3,116,639, and in the White U.S. Pat. No. 3,650,152. Flowmeters of the vortex-shedding type, such as those disclosed in the Burgess U.S. Pat. No. 3,888,120 and the Herzl U.S. Pat. No. 4,162,238, are capable of effecting accurate volumetric or mass flow measurement.

The above-identified copending patent application (C), whose entire disclosure is incorporated herein by reference, discloses a vortex-type flowmeter in which fluidic oscillations produced by a shedder mounted in a flow pipe are sensed by a downstream balanced-vane sensor pivoted in a torsional suspension that allows only microscopic vane motion. The shedder acts to divide the incoming fluid flowing therethrough and causes vortices to be shed alternately on either side thereof. The downstream train of vortices passing on either side of the vane sensor generates fluidic forces giving rise to alternate clockwise and counterclockwise torques, causing the sensor to oscillate mechanically at a frequency proportional to the flow rate of the fluid being metered.

The above-identified copending patent application (B), whose entire disclosure is incorporated herein by reference, discloses a vortex-shedding flowmeter wherein torsionally-supported behind the shedder is a drag-actuated sensor which includes a pair of parallel legs symmetricaly disposed with respect to the longitudinal axis of the flow pipe.

With a drag-actuated sensor, as vortices are successively detached from the shedder and appear alternately on either side of the gap between the shedder and the downstream sensor, the low pressure region generated by each vortex acts to displace the stagnant zone produced in this gap as a result of fluid flow past the shedder to a position in front of the adjacent leg of the sensor, the fluid flow then going around and past the other leg, thereby developing a torque about the pivot axis. These torques are developed alternately, causing the torsionally-supported sensor to oscillate at a frequency in accordance with flow rate.

In both patent applications (B and C), the oscillatory motion of the torsionally-supported sensor is detected by means of a transducer which takes the form of a strain gauge bonded to a resilient beam, one end of which is attached to the trunnion or shaft of the sensor projecting through the flow pipe, the other end being anchored. The resultant deformation of the beam as the shaft oscillates is translated by the strain gauge into a corresponding electrical signal whose frequency is indicative of flow rate.

As pointed out in the earlier-filed copending patent applications (B) and (C), an important advantage of a vortex flowmeter having a torsionally-mounted sensor is that the meter is effective and accurate for both liquid and gas flow measurements. Though the vortex-type flowmeters disclosed therein represent a significant advance over prior art vortex-type meters, such as those disclosed in the above-identified patents, their torque transducer arrangements have certain drawbacks and therefore fall short of an ideal arrangement.

The torque transducer arrangement disclosed in the above-identified patent application (A) closely approaches the ideal requirements for a sensing system constituted by a torque transducer associated with a torsionally-mounted sensor in a vortex-type flowmeter. These ideals are as follows:

A. The system has a sensitivity which renders the meter effective for low-pressure gas measurement.

B. The system is one which has an inherent ruggedness that renders the meter suitable for heavy-duty liquid flow rate measurement.

C. The system is insensitive to mechanical vibration and shock and acceleration forces to which the flowmeter is subjected.

D. The system is capable of operating over the broad temperature range normally encountered in gas and liquid measurement and is capable of operating over a very wide operating frequency range.

E. The sensing system requires virtually no motion and is not limited by torque transducer bonding or attachment problems.

F. Finally, the sensing system is one which is relatively inexpensive and has a compact structure.

In the torque transducer arrangement disclosed in application (A), the transducer cooperates with an extension of the shaft on which the torsionally-mounted sensor of the vortex meter is pivoted, the shaft extension having two flat parallel faces on opposing sides thereof. The transducer assembly is constituted by a first pair of parallel-connected piezoelectric elements lying in a common plane and interposed between one face of the shaft extension and a first pre-loading block, and a second pair of parallel-connected piezoelectric elements lying in a common plane and interposed between the opposite face of the shaft extension and a second pre-loading block, the movement of the extension being restricted by the pre-loaded elements to a degree whereby the extension is virtually motionless. The two pairs of parallel-connected elements are connected to output terminals and are so polarized in relation to the faces in the shaft extension that alternate clockwise and counterclockwise torques cause the interconnected elements to generate an alternating voltage of the same frequency.

In the vortex-shedding flowmeters disclosed in my earlier-filed applications (A), (B) and (C), the sensor in each instance is torsionally mounted on a shaft projecting through a bore in the flow pipe, the free end of the shaft being operatively coupled to an external transducer to convert the oscillatory motion of the sensor into a corresponding electrical signal. In order to prevent fluid leakage through the bore, the shaft therethrough is provided with an elastomeric seal made of neoprene or a material having similar elastomeric and physical properties.

While an elastomeric seal functions effectively under normal operating conditions even when corrosive fluids are being metered which are either very hot or very cold, it is not an acceptable seal under extreme conditions. Thus an elastomeric seal may break down under extremely high temperature operating conditions, such as those encountered with steam or liquid salts, or under extremely low temperature conditions involving cryogenic liquids such as liquid nitrogen or oxygen, or liquefied natural gas.

In my above-identified companion application, whose entire disclosure is incorporated herein by reference, the torsional mounting of the sensor in the vortex flowmeter is such as to link the sensor to an external transducer in a manner dispensing with the need for an elastomeric seal whereby the integrity of the flow pipe is maintained and the meter is capable of operating efficiently, even under extreme conditions.

In the companion application, the sensor is torsionally supported downstream behind the shedder on a pivot axis normal to the flow axis of the pipe, the torsional support including a torque tube whose base is received within a bore in the pipe and is welded thereto, the tip of the tube being welded to one end of the sensor to provide a closed structure preventing leakage of the fluid from the pipe.

In operation, as the incoming fluid stream is divided by and flows past the shedder, vortices are successively detached therefrom and appear alternately on either side of the sensor to develop alternating torques about the pivot axis, causing the sensor to oscillate at a rate proportional to the flow rate of the fluid. These oscillations are converted into corresponding electrical signals by an external torque transducer operatively coupled to the sensor by a link assembly including a rod which extends coaxially into the torque tube and is welded to the tip thereof.

Thus the flowmeter disclosed in my companion application is seal-less and thereby overcomes seal problems otherwise encountered under extreme temperature conditions. But because the meter has both a fixedly-mounted shedder and a torsionally-mounted sensor, one disposed behind the other in a flow pipe, the requirement for two bodies militates against the design of small-scale, low-cost meters of the simplest possible construction.

SUMMARY OF INVENTION

In view of the foregoing, the main object of this invention is to provide a vortex-shedding flowmeter in which the necessary shedding and sensing functions are integrated into and carried out by a single torsionally-mounted body, hereinafter referred to as a shedder/sensor unit.

While the invention is preferably embodied in a seal-less meter having a torsional mounting which is of the type disclosed in my companion case wherein the linkage assembly for the external transducer dispenses with the need for elastomeric seals, the invention is not limited thereto and is also applicable to arrangements of the types disclosed in my copending applications (A), (B) and (C), wherein the torsionally-mounted body is supported on journals or shafts extending through bores in the flow pipe, which shafts are provided with elastomeric seals.

A significant advantage of a flowmeter in accordance with the invention which makes use of a torsionally-mounted shedder/sensor unit is that it lends itself to inclusion in small-scale, low-cost meters and yet essentially exhibits the operating characteristics and advantages of vortex-shedding meters having separate shedder and sensor bodies.

Briefly stated, these objects are attained in a vortex-shedding flowmeter capable of accurately measuring the flow rate of a liquid or gas even under extreme operating conditions. The fluid to be metered is conducted through a flow pipe having a shedder/sensor unit torsionally supported therein in a pivot axis normal to the flow axis of the pipe, the torsional support including a torque tube whose base is received within a bore in the pipe and is welded thereto and whose tip is welded to one end of the shedder/sensor unit to provide a closed structure preventing leakage of fluid from the pipe.

In operation, as the incoming fluid stream is divided by and flows past the unit, vortices are shed therefrom alternately on either side to develop an alternating torque about the pivot axis, causing the unit to oscillate at a rate proportional to the flow rate of the fluid whereby the unit acts both as a shedder of vortices and as a sensor thereof. These oscillations are converted into corresponding electrical signals by an external torque transducer operatively coupled to the unit by a sensor link assembly including a rod which extends into the torque tube and is welded to the tip thereof.

OUTLINE OF DRAWINGS

For a better understanding of the invention as well as other objects and further features thereof, reference is made to the following detailed description to be read in conjunction with the accompanying drawings, wherein:

FIG. 1 schematically illustrates in end view one embodiment of a shedder/sensor unit in accordance with the invention having a trapezoidal cross section; the unit being shown in a Position A at one moment in time when the forces imposed thereon by vortices produce a clockwise torque, and in a Position B at a succeeding moment when the existing forces then produce a counterclockwise torque;

FIG. 2 schematically illustrates, in end view, a second embodiment of a shedder/sensor unit in accordance with the invention, the unit having a T-shaped cross section and being shown in positions A and B;

FIG. 3 schematically illustrates, in end view, a third embodiment of a shedder/sensor unit in accordance with the invention, the unit having a triangular cross section and being shown in positions A and B;

DESCRIPTION OF INVENTION

Figure 1:
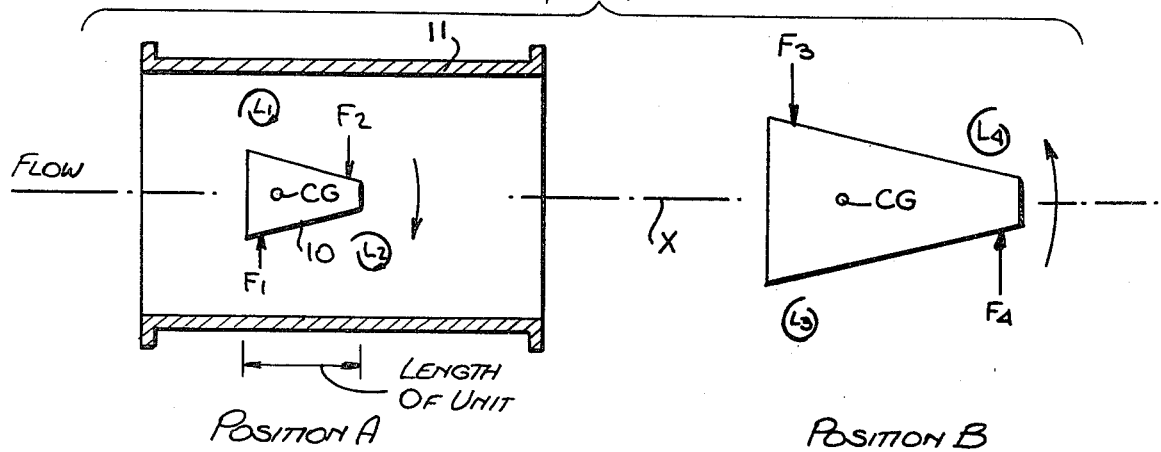

Theory of Operation:

Referring now to FIG. 1 schematically showing a first embodiment of a shedder/sensor unit in accordance with the invention, it will be seen that the unit 10 which is shown in end view, has a trapezoidal cross section. The unit is torsionally-supported across a flow pipe 11 along a pivot axis which passes through the center of gravity CG of the unit, whereby the unit, which is statically and dynamically balanced, is free to oscillate about this axis which is normal to the flow axis X of the flow pipe.

In operation, unit 10 acts as an obstacle in the flow pipe and functions to divide the stream of incoming fluid to be metered to produce vortices alternately on one side and then on the other side at a repetition rate proportional to the flow rate of the fluid. As a consequence of this shedding action, moving trains of vortices are caused to travel on the left side and on the right side of the flow pipe, these trains flanking the opposite sides of the unit.

Position A in FIG. 1 represents the condition existing at a particular moment in time when a vortex $L_1$ appears on the left side of unit 10 adjacent the leading edge thereof, and a vortex $L_2$ appears on the right side of the unit adjacent its trailing edge.

Because a vortex in a fluid stream creates a low pressure region therein, the low pressure produced by vortex $L_1$ on the left side gives rise to a fluidic force $F_1$ on the right side of the unit which is imposed on the leading edge of the unit in a direction tending to turn the unit about its pivot axis CG in the clockwise direction. At the same time, the low pressure region produced by vortex $L_2$ on the right side gives rise to a fluidic force $F_2$ of the left side of the unit which is imposed on the trailing edge of the unit in a direction also tending to turn the unit about its pivot axis in the clockwise direction. Thus forces $F_1$ and $F_2$ cooperate to create a strong clockwise torque.

Position B in FIG. 1 represents the condition which exists in the succeeding moment of time when the relationship of vortices $L_3$ and $L_4$ to the unit is the reverse of that of vortices $L_1$ and $L_2$. Since vortex $L_3$ produces a low pressure region at the right side, the resultant force $F_3$ is imposed on the left side against the leading edge of the unit and tends, therefore, to turn the unit about its pivot axis in the counterclockwise direction. And since vortex $L_4$ produces a low pressure region at the left side, the resultant force $F_4$ is imposed on the right side against the trailing edge of the unit and tends, therefore, to turn the unit in the counterclockwise direction, forces $F_3$ and $F_4$ being in cooperative relation.

Unit 10 is mounted on very stiff torque tubes, as will later be described, or is otherwise torsionally-mounted so that it is highly resistant to movement and is only permitted to oscillate with a microscopic excursion in either direction such that at maximum deflection the movement of the unit away from its neutral position in either direction is no more than a small fraction of one mil. The unit, therefore, effectively functions, in mechanical terms, as though it were rigidly mounted; for the microscopic motion thereof, though sufficient to excite a transducer to generate a flow rate electrical signal, is insignificant and will therefore not react adversely with the hydraulic vortex-shedding process.

Otherwise stated, the reason why it has heretofore been thought necessary to provide in a vortex-shedding flowmeter separate fixed shedder and deflectable sensor bodies, the first developing periodic vortices and the second sensing these vortices, is that for accurate flow rate measurment it is essential that the position of the shedder be virtually motionless. However, by providing an integrated shedder/sensor unit in accordance with the invention, it becomes possible to carry out both functions in a single body; for the microscopic motion necessary for sensing of the vortices is not incompatible with the shedding function.

Figure 2:
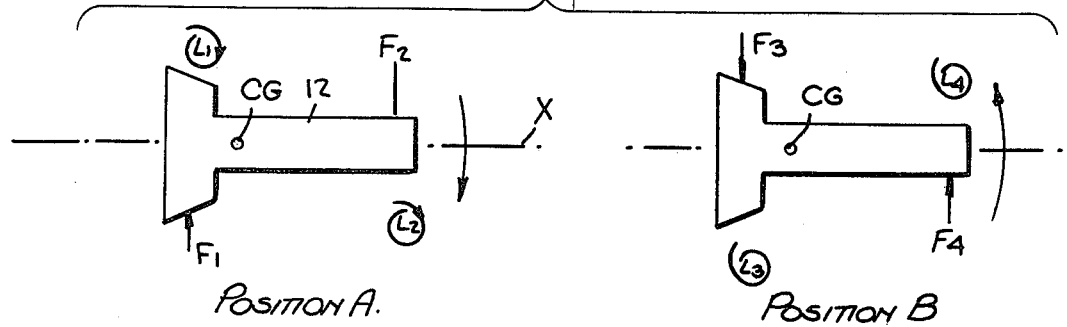

In FIG. 2, the integrated shedder/sensor unit 12 has a T-shaped cross section and is torsionally-supported within a flow pipe on a pivot axis which coincides with the center of gravity of this body and is normal to the flow axis X of the flow (not shown).

Figure 3:
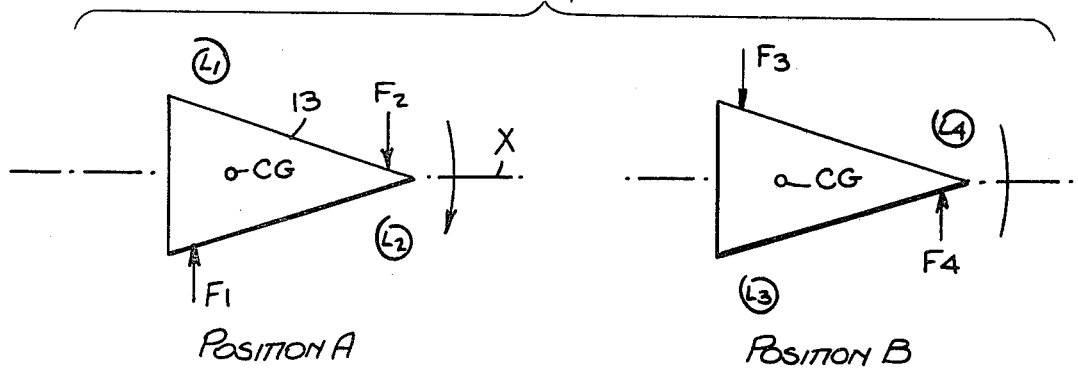

Here again, the relationship of the vortices to the forces existing at the moment of time represented by position A produces a clockwise movement about the pivot axis, while at the succeeding moment of time represented by position B, it produces a counterclockwise movement. In FIG. 3, the integrated shedder/sensor unit 13 has a triangular cross section, a clockwise movement being produced at position A and a counterclockwise movement at position B.

While longer shedding bodies are preferred, torsional forces will be set up around all but cylindrical bodies having a round cross section. Hence the invention is applicable to non-cylindrical shedder/sensor unit forms other than those shown in FIGS. 1 to 3, such as those having a rectangular cross-sectional form. Torsionally-mounted sensors, as explained in the above-identified copending applications, have excellent immunity to all forces other than those producing a torsional movement and therefore act to minimize noise signals resulting from vibratory and other extrinsic forces.

Figure 4:
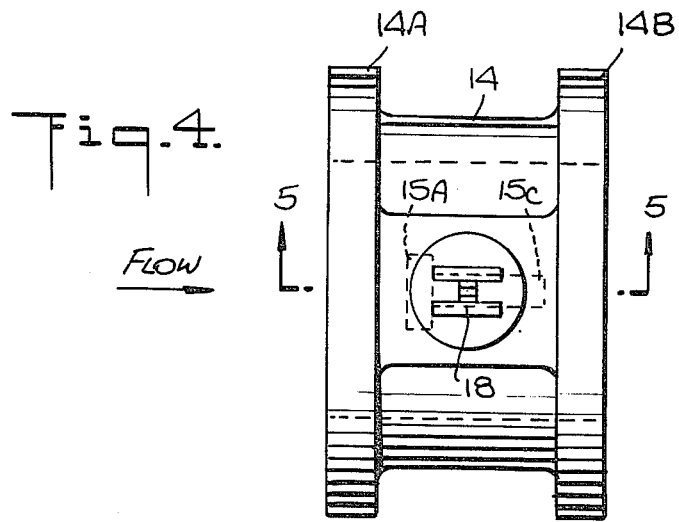
FIG. 4 is a plan view of a vortex-shedding flowmeter structure that includes a fourth embodiment of a torsionally-mounted shedder/sensor unit in accordance with the invention.
Figure 5:
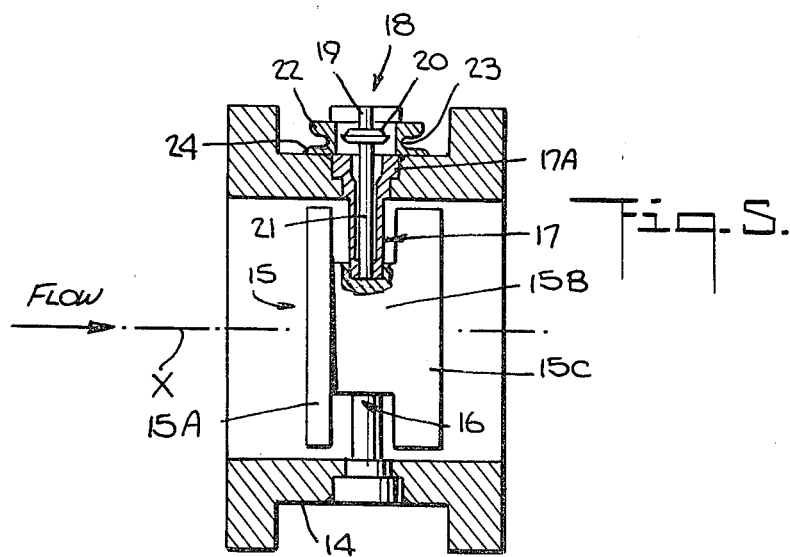
FIG. 5 is a section taken in the plane indicated by line 5—5 in FIG. 4.
Figure 6:
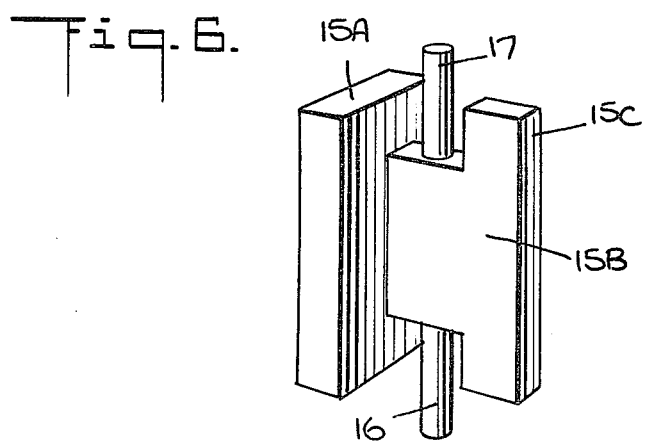
FIG. 6 is a separate perspective view of the unit illustrated in FIG. 5.

Single Body Meter:

Referring now to FIGS. 4, 5 and 6, there is shown a single body flowmeter of the vortex-shedding type in accordance with the invention. The meter is provided with a cylindrical flow pipe 14 having end flanges 14A and 14B. In practice, flow pipe 14, which serves as the body of the meter, is interposed in a process line carrying a liquid or gas whose flow is to be metered, the end flanges being bolted to the end flanges of the upstream and downstream pipes of the line.

Mounted transversely within flow pipe 14 is an integrated shedder/sensor unit, generally identified by reference numeral 15, having a rectangular plate leading section 15A whose broad front face looks toward the incoming fluid and whose rear face is joined at its center zone by an intermediate section beam 15B having a rectangular cross section to a rectangular bar tail section 15C whose width is the same as that of the beam and whose height is the same as that of the leading section.

The unit is torsionally mounted on a pivot axis which coincides with its center of gravity and is perpendicular to the longitudinal flow axis X of flow pipe 10. The incoming flow stream which impinges on unit 15 is divided thereby, producing fluidic perturbations in the form of a Karman vortex street. Unit 15 is pivotally supported by lower and upper torque tubes 16 and 17 which are attached to the intermediate section beam 15B, the torque tubes lying on the pivot axis.

Lower torque tube 16 has its stepped base section 16A seated within and welded to a like-shaped bore in flow pipe 14 and its tip 16B welded to the lower edge of intermediate section 15B. Upper torque tube 17, as best seen in FIG. 5, is arranged so that its stepped base section 17A is received within a similarly-configured bore extending through the wall of flow pipe 14, the end of this base section being welded to the pipe. The tip section 17B of torque tube 17 is received within and welded to a socket formed in the upper edge of intermediate section 15B of the unit.

The unit is operatively coupled to an external torque transducer, generally designated by numeral 18, by a link assembly which serves to transmit the torsional motion of upper torque tube 17 to torque transducer 18. This transducer is preferably a balanced piezoelectric structure of the type disclosed in copending application A. The transducer includes a pair of sub-assemblies each interposed between a stationary pre-loading block and a respective face of the rod extension 19 of the link assembly, each sub-assembly including a pair of piezoelectric elements in side-by-side relation. Rod extension 19 is coupled by a coupler 20 to a main rod 21 which extends into torque tube 17 and is anchored in the tip section of this tube and welded thereto.

Coupler 20 is formed by a pair of cup-shaped flexible diaphragms in face-to-face relation whose circular flanges are welded together to define a cell similar to that of an aneroid barometer. Torque transducer 18 is seated on the annular upper section 22 of an isolator which is joined by a cylindrical intermediate section 23 to an annular lower section 24, coupler 20 being disposed within the isolator. Lower section 24 is secured to flow pipe 14 by screwed clamps (not shown).

Transducer 18 detects the motion of unit 15 as it oscillates about its pivot axis to produce a signal whose frequency is proportional to the flow rate of the fluid being metered. The torsional suspension of the unit effected by torque tubes 16 and 17 limits pivot motion at maximum torque to a microscopic motion in the order of a half micron in either direction from the neutral position; hence the unit is virtually motionless in operation.

In this meter arrangement, the torsional force created by the torsionally-mounted unit 15 is applied to the outside of upper torque tube 17 which is welded to flow pipe 14. The resultant torsional motion of torque tube 17 is transmitted by main rod 21, coupler 20 and extension rod 19 of the link assembly to the external piezoelectric torque transducer 18. Hence the present arrangement dispenses with the need for seals; for the integrity of the flow conduit is maintained by the welded torque tube structure.

However, though the present arrangement overcomes those problems which arise when using elastomeric seals, and makes it feasible to operate the flowmeter under extreme conditions of temperature, the sealless arrangement creates a whole new series of problems which must be solved to render the meter effective as a practical flow rate measuring instrument.

To being with, the torque tube must be strong enough to sustain internal flowmeter pressure and to withstand the forces generated at maximum fluid flow. At the same time, the torque tube must be sufficiently stiff to impart to unit 15 a resonance frequency characteristic that is well above the maximum operating frequency of the meter in the anticipated range of fluid flow velocities. The reason for this latter requirement is that if the resonance frequency of the unit lies in the vicinity of the maximum operating frequency of the flowmeter, the unit will be excited into resonance, with highly disturbing effects on the output signal.

No problem is encountered in designing a torque tube made of steel or other suitable metal which satisfies these strength and stiffness requirements. On the other hand, the torque-sensing system must also be sensitive to low velocity fluid flow. A system which meets the criteria regarding strength and stiffness will inherently act to attenuate the forces reaching the torque transducer by several orders of magnitude.

While the gain of the electronic system which receives and processes the flow rate signal from the piezoelectric torque transducer can be raised to compensate for the attenuated signal resulting from the required stiff torque tube structure, background or noise signals originating from sources other than the flow of fluid through the flow pipe may give rise to an unfavorable signal-to-noise ratio; for now the noise component becomes large relative to the attenuated flow rate signal.

In order, therefore, to improve the signal-to-noise ratio, one must attenuate the noise component. But before we explain how coupler 20 and the isolator (22, 23, 24) act to effect such attenuation, the sources of noise must first be considered. In a flowmeter of the type illustrated herein, torsionally-mounted unit 15 is in relatively close proximity to mounting flanges 14A and 14B of flow pipe 14. Hence when flow pipe 14 is interposed in a flow line by bolting the flow pipe flanges to the flanges of the upstream and downstream pipes of the line, very large forces are applied to flanges 14A and 14B. And if the upstream and downstream pipes are included in an industrial process line subject to vibration, vibratory forces will be applied to the faces of flow pipe flanges 14A and 14B.

If external torque transducer 18 were mounted directly on flow pipe 14, a significant percentage of the vibratory forces transmitted to this pipe would also be conveyed to the transducer and the noise component of the signal produced thereby would be very high. Although, as explained in copending application A, the balanced piezoelectric torque transducer 18 has a good signal rejection capability in the X, Y and Z planes, the unwanted noise generated by vibratory forces still attains an objectionable level in some cases. We shall now explain how these forces are attenuated.

It will be seen in the drawing that the upper annular section 22 of the isolator is relatively thick and therefore stiff. But the cylinder intermediate section 23 and the annular lower section 24 are deliberately made relatively thin and flexible. As a consequence, any microscopic deflection of the flow pipe due to external forces would cause deflection of these sections and would impart a relatively modest force on the upper section 22 of the isolator on which transducer 18 is mounted. In this way, there is reduced transmission of vibratory forces to the transducer and the noise component in the signal generated thereby is cut down.

With proper design of the isolator structure, the forces conveyed thereby to transducer 18 can be reduced to several orders of magnitude lower than those existing in the meter body. For example, the effectiveness of the lower deflectable section 24 of the isolator may be enhanced by giving it a convoluted or corrugated diaphragm configuration to more effectively absorb the forces applied thereto.

Moreover, the isolator structure plays a role in the thermal characteristics of the meter sensing system; for the thin lower and intermediate metal sections 23 and 24 define an extended path of poor thermal conductivity between the body of the meter (i.e., flow pipe 14) and transducer 18 mounted on upper section 22. This path functions to effectively isolate the transducer from rapid temperature transients and makes it possible for the transducer to operate nearly at ambient temperature despite its closness to the meter body.

Coupler 20 in the sensor link assembly, which intercouples main rod 21 to extension rod 19, functions as a torsional forces coupling which minimizes the effects of bending and misalignment forces. The coupler serves to decouple and thereby attenuate bending forces set up in the sensor link assembly when torque tube 17 is bent by forces acting on unit 15, the coupler keeping these bending forces away from transducer 18.

Coupler 20 also plays a role in the thermal characteristics of the sensing system. As in the case of the isolator, coupler 20 acts to extend the thermal conduction path between unit and transducer 18, and in this way isolates the transducer from rapid temperature transients.

In addition, coupler 20 carries out an even more important function; for when rapid temperature changes occur in the flowmeter, torque tube 17 and the link assembly may then temporarily assume different temperature levels. The resultant differential expansion caused by the transitory temperature difference would, in the absence of coupler 20, give rise to large forces which would be exerted on transducer 15. But with the coupling interposed between transducer 18 and torque tube 17, the differential expansion caused by a transitory temperature difference is largely absorbed by the coupling and therefore imposes no significant force on the transducer.

While there have been shown and described preferred embodiments of a vortex-shedding flowmeter with unitary shedder/sensor in accordance with the invention, it will be appreciated that many changes and modifications may be made therein without, however, departing from the essential spirit thereof.

I claim:

1. A vortex-shedding flowmeter capable of accurately measuring the flow rate of a fluid even under extreme conditions of temperature, the flowmeter comprising:

A a flow pipe through which the fluid to be metered is conducted along a flow axis;

B a shedder/sensor unit having a non-circular cross-sectional configuration torsionally supported in said flow pipe along a pivot axis which coincides with the center of gravity of the unit, which axis is at right angles to the flow axis, whereby said unit which is statically and dynamically balanced is intercepted by the fluid to shed vortices on alternate sides and is caused by said vortices to oscillate about said pivot axis at a rate proportional to flow, the support therefor including a relatively stiff torque tube whose base is received within a bore in said flow pipe and is joined thereto and whose tip is joined to one end of said unit to exclude said fluid from the interior of said tube, said support effectively restricting said oscillations to a microscopic movement to prevent an interaction between said movement and the shedding action;

C a transducer external to said pipe to convert the unit oscillations into corresponding electrical signals; and D a link assembly coupling said unit to said transducer and including a main rod extending into the interior of said torque tube and joined to the tip thereof, whereby the motion of the tube is transmitted via the rod to said transducer.

2. A flowmeter as set forth in claim 1, wherein said pipe is provided at its ends with mounting flanges which are boltable to the end flanges of upstream and downstream pipes of a flow line conveying said fluid.

3. A flowmeter as set forth in claim 1, wherein said support further includes a second torque tube whose tip is jointed to the unit at the other end thereof and whose base is joined to the flow pipe.

4. A flowmeter as set forth in claim 3, wherein said torque tubes are fabricated of high strength metal and are relatively stiff.

5. A flowmeter as set forth in claim 4, wherein the stiffness of the torque tubes imparts a resonance characteristic to said unit whose resonance frequency is well above the maximum frequency in the operating range of the flowmeter.

6. A flowmeter as set forth in claim 1, further including an extension rod coupled to said main rod to link said main rod to said transducer.

7. A flowmeter as set forth in claim 6, wherein said extension rod is coupled by a diaphragm coupler to said main rod to attenuate the transmission of bending forces imposed on said torque tube.

8. A vortex-shedding flowmeter capable of accurately measuring the flow rate of a fluid even under extreme conditions of temperature, the flowmeter comprising:

A a flow pipe through which the fluid to be metered is conducted along a flow axis;

B a shedder/sensor unit having a non-circular cross section torsionally supported in said flow pipe along a pivot axis which coincides with the center of gravity of the unit, which axis is at right angles to the flow axis, whereby said unit which is statically and dynamically balanced is intercepted by the fluid to shed vortices on alternate sides and is caused by said vortices to oscillate about said pivot axis at a rate proportional to flow, said support being relatively stiff to effectively restrict said oscillation to a microscopic movement to prevent an interaction between said movement and the shedding action;

C a transducer external to said pipe to convert the unit oscillations into corresponding electrical signals; and D a link assembly coupling said unit to said transducer.

9. A flowmeter as set forth in claim 1, wherein said unit is formed by a body having a trapezoidal cross section, the front face thereof being large relative to the rear face thereof and facing the incoming fluid.

10. A flowmeter as set forth in claim 1, wherein said unit is formed by a body having a rectangular leading section whose broad front face looks toward the incoming fluid, the leading section being joined to a tail section by a beam through which passes said pivot axis.

11. A flowmeter as set forth in claim 1, wherein said body has a triangular cross section whose base faces the incoming fluid.

* * * * *